(12) United States Patent
Song et al.

(10) Patent No.: US 11,809,970 B2
(45) Date of Patent: Nov. 7, 2023

(54) TRAVEL PREDICTION METHOD AND APPARATUS, DEVICE, AND STORAGE MEDIUM

(71) Applicant: SOUTH UNIVERSITY OF SCIENCE AND TECHNOLOGY OF CHINA, Shenzhen (CN)

(72) Inventors: Xuan Song, Shenzhen (CN); Zipei Fan, Shenzhen (CN); Quanjun Chen, Shenzhen (CN); Renhe Jiang, Shenzhen (CN); Zekun Cai, Shenzhen (CN); Ryosuke Shibasaki, Shenzhen (CN)

(73) Assignee: South University of Science and Technology of China, Guangdong (CN)

( * ) Notice: Subject to any disclaimer, the term of this patent is extended or adjusted under 35 U.S.C. 154(b) by 782 days.

(21) Appl. No.: 16/931,757

(22) Filed: Jul. 17, 2020

(65) Prior Publication Data
US 2021/0312326 A1   Oct. 7, 2021

(30) Foreign Application Priority Data

Apr. 2, 2020 (CN) .......................... 202010255483.5

(51) Int. Cl.
*G06N 20/00* (2019.01)
*G01C 21/34* (2006.01)

(52) U.S. Cl.
CPC ......... *G06N 20/00* (2019.01); *G01C 21/3446* (2013.01)

(58) Field of Classification Search
CPC ............................ G01C 21/3446; G06N 20/00
See application file for complete search history.

(56) References Cited

U.S. PATENT DOCUMENTS 10,452,978 B2 * 10/2019 Shazeer ................. G06N 3/045
10,503,978 B2 * 12/2019 Kadav ..................... G06V 20/41
(Continued)

FOREIGN PATENT DOCUMENTS

| CN | 104159189 | 11/2014 |
| CN | 107820214 | 3/2018 |

(Continued)

OTHER PUBLICATIONS

Huang, 2019, Elsevier, pp. 44-55.*
(Continued)

*Primary Examiner* — Michael I Ezewoko
(74) *Attorney, Agent, or Firm* — KDW Firm PLLC

(57) ABSTRACT

A travel prediction method, apparatus, device, and storage medium. The method includes obtaining search data and travel path data of a user, performing spatial information mining based on the search data obtaining first spatial information and performing spatial information mining based on the travel path data obtaining second spatial information, performing time information mining based on the first spatial information obtaining first time information and performing time information mining based on the second spatial information obtaining second time information, performing information interaction based on the first spatial information, the second spatial information, the first time information, and the second time information obtaining an interaction feature, the interaction feature including a time feature and/or a spatial feature, and predicting a travel probability of the user going to a target location in a target time period based on the interaction feature, where the target time period matches the time feature, and the spatial feature matches the target location.

10 Claims, 4 Drawing Sheets

(56) References Cited

U.S. PATENT DOCUMENTS

| | | | |
|---|---|---|---|
| 10,506,383 B2* | 12/2019 | Haski | G06Q 50/01 |
| 10,719,764 B2* | 7/2020 | Shazeer | G06N 3/04 |
| 10,740,433 B2* | 8/2020 | Dehghani | G06N 3/044 |
| 10,789,427 B2* | 9/2020 | Shazeer | G06F 40/284 |
| 10,796,686 B2* | 10/2020 | Arik | G10L 13/08 |
| 10,839,259 B2* | 11/2020 | Shazeer | G06N 3/047 |
| 10,853,725 B2* | 12/2020 | Chrzanowski | G06N 3/04 |
| 10,902,738 B2* | 1/2021 | Yuan | G06N 3/045 |
| 10,938,840 B2* | 3/2021 | Stokes, III | G06N 3/042 |
| 10,956,819 B2* | 3/2021 | Shazeer | G06N 3/08 |
| 11,017,761 B2* | 5/2021 | Peng | G10L 25/30 |
| 11,100,920 B2* | 8/2021 | Moritz | G10L 19/00 |
| 11,107,463 B2* | 8/2021 | Prabhavalkar | G10L 15/16 |
| 11,113,479 B2* | 9/2021 | Tran | G06F 17/16 |
| 11,113,602 B2* | 9/2021 | Shazeer | G06N 3/04 |
| 11,163,947 B2* | 11/2021 | Mezaoui | G06N 20/20 |
| 11,170,789 B2* | 11/2021 | Meng | G06N 3/045 |
| 11,205,444 B2* | 12/2021 | Bui | G06N 3/044 |
| 11,238,843 B2* | 2/2022 | Arik | G10L 13/08 |
| 11,263,514 B2* | 3/2022 | Vinyals | G06N 3/044 |
| 11,263,753 B2* | 3/2022 | Larlus-Larrondo | G06N 3/084 |
| 11,288,438 B2* | 3/2022 | Le | G06F 40/10 |
| 11,392,790 B2* | 7/2022 | Shazeer | G06T 3/4053 |
| 11,392,833 B2* | 7/2022 | Wieman | G06N 3/084 |
| 11,393,487 B2* | 7/2022 | Fazeli | G06N 20/10 |
| 11,468,246 B2* | 10/2022 | Olabiyi | G10L 15/063 |
| 11,482,244 B2* | 10/2022 | Wang | G10L 21/02 |
| 11,487,954 B2* | 11/2022 | Olabiyi | G06N 3/048 |
| 11,556,786 B2* | 1/2023 | Shazeer | G06N 3/045 |
| 11,562,591 B2* | 1/2023 | Nguyen | G06V 30/19173 |
| 11,580,317 B2* | 2/2023 | Arslan | G06N 3/045 |
| 11,604,968 B2* | 3/2023 | Ott | G06N 3/084 |
| 11,615,255 B2* | 3/2023 | Olabiyi | G06F 40/35 704/9 |
| 11,646,019 B2* | 5/2023 | Prabhavalkar | G10L 15/063 704/232 |
| 11,651,163 B2* | 5/2023 | Olabiyi | G06N 3/049 704/232 |
| 2017/0200076 A1* | 7/2017 | Vinyals | G06N 3/044 |
| 2019/0043379 A1* | 2/2019 | Yuan | G09B 7/02 |
| 2020/0293729 A1* | 9/2020 | Arslan | G06K 17/00 |
| 2020/0387963 A1* | 12/2020 | Byiringiro | G06N 3/044 |
| 2021/0027022 A1* | 1/2021 | Olabiyi | G06F 40/30 |
| 2021/0027023 A1* | 1/2021 | Olabiyi | G06N 3/045 |
| 2021/0027025 A1* | 1/2021 | Olabiyi | G06F 40/56 |
| 2021/0027770 A1* | 1/2021 | Olabiyi | G06N 3/045 |
| 2021/0034812 A1* | 2/2021 | Mezaoui | G06N 3/04 |
| 2021/0050033 A1* | 2/2021 | Bui | G06F 17/16 |
| 2021/0056162 A1* | 2/2021 | Dehghani | G06N 3/044 |
| 2021/0081503 A1* | 3/2021 | Tran | G06N 3/08 |
| 2021/0081795 A1* | 3/2021 | Chrzanowski | G06N 3/045 |
| 2021/0089867 A1* | 3/2021 | Byeon | G06N 3/044 |
| 2021/0133279 A1* | 5/2021 | Shirani | G06F 40/279 |
| 2021/0134173 A1* | 5/2021 | Yuan | G09B 7/02 |
| 2021/0150118 A1* | 5/2021 | Le | G06N 3/044 |
| 2021/0150410 A1* | 5/2021 | Liang | G06V 10/46 |
| 2021/0192201 A1* | 6/2021 | Nguyen | G06V 20/62 |
| 2021/0256386 A1* | 8/2021 | Wieman | G06N 3/044 |
| 2022/0028399 A1* | 1/2022 | Meng | G10L 15/063 |
| 2022/0044809 A1* | 2/2022 | Bihorac | G16H 10/60 |
| 2022/0076693 A1* | 3/2022 | Bui | G06N 3/044 |
| 2022/0180151 A1* | 6/2022 | Vinyals | G06N 3/044 |
| 2022/0415306 A1* | 12/2022 | Clark | G06N 3/045 |

FOREIGN PATENT DOCUMENTS

| | | |
|---|---|---|
| CN | 108804646 A | 11/2018 |
| CN | 109583648 A | 4/2019 |
| WO | WO 2017/031856 A1 | 3/2017 |

OTHER PUBLICATIONS

Huang, Feb. 2020, Elsevier, pp. 1-10.*
Li, 2015, arXiv, pp. 1-10.*
Liu, 2019, Elsevier, pp. 1-22.*
Sun, 2019, Elsevier, pp. 1-29.*
Yang, Proceedings of NAACL-HLT 2016, pp. 1480-1489.*
Zhao, Feb. 2020, Elsevier, pp. 1-14.*
Chinese Office Action for Application No. 202010255483 dated Apr. 13, 2022.

* cited by examiner

TRAVEL PREDICTION METHOD AND APPARATUS, DEVICE, AND STORAGE MEDIUM

CROSS-REFERENCE TO RELATED APPLICATION

This application claims the priority and benefit of China patent application No. 202010255483.5 filed on Apr. 2, 2020, the disclosure of which is hereby incorporated herein by reference in its entirety.

TECHNICAL FIELD

The present disclosure relates to the field of big data and, in particular, to a travel prediction method and apparatus, a device, and a storage medium.

BACKGROUND

With the development in the era, prediction of users' travel demand information is of great significance. It is about improving the traffic efficiency of urban roads, and also plays an important role in the analysis of social security stability, and can also be used as the basis for the recommendation of travel advertising. In the related art, the travel predictions are mostly analyzed merely based on collected travel path data of a user, and similarly in the travel prediction involving travel advertising, only the user's search data and travel path data are taken as the data basis, and the travel prediction is directly performed based on a model tree method or a factorization machine method, the data mining of which is too simplistic, and the obtained prediction result is not ideal.

SUMMARY

Embodiments of the present disclosure provide a travel prediction method and apparatus, a device, and a storage medium, which provide deeper data mining, hence better prediction effect.

In a first aspect, an embodiment of the present disclosure provides a travel prediction method, which includes the following:

obtaining search data and travel path data of a user;

performing spatial information mining based on the search data to obtain first spatial information, and performing spatial information mining based on the travel path data to obtain second spatial information;

performing time information mining based on the first spatial information to obtain first time information, and performing time information mining based on the second spatial information to obtain second time information;

performing information interaction based on the first spatial information, the second spatial information, the first time information, and the second time information to obtain an interaction feature, wherein the interaction feature comprises a time feature and/or a spatial feature; and predicting a travel probability of the user going to a target location in a target time period based on the interaction feature, the target time period matching the time feature, and the spatial feature matching the target location.

More specifically, performing the spatial information mining based on the search data to obtain the first spatial information may include the following:

determining longitude and latitude information of a user-searched location according to the search data; and mapping the longitude and latitude information of the user-searched location to a high-dimensional space to obtain the first spatial information; and wherein performing the spatial information mining based on the travel path data to obtain the second spatial information comprises:

determining longitude and latitude information of a user-passed location according to the travel path data; and mapping the longitude and latitude information of the user-passed location to a high-dimensional space to obtain the second spatial information.

More specifically, mapping the longitude and latitude information of the user-searched location to the high-dimensional space to obtain the first spatial information may include the following:

mining behavior information corresponding to the user-searched location based on the longitude and latitude information of the user-searched location; and determining the first spatial information based on the behavior information corresponding to the user-searched location.

More specifically, performing the time information mining based on the first spatial information to obtain the first time information may include the following:

sorting the first spatial information in chronological order to obtain a first sequence; and determining the first time information based on the first sequence.

Performing the time information mining based on the second spatial information to obtain the second time information may include the following:

sorting the second spatial information in chronological order to obtain a second sequence; and determining the second time information based on the second sequence.

More specifically, determining the first time information based on the first sequence may include the following:

inputting the first spatial information into a first preset model to obtain first key information; and inputting the first sequence into a second preset model constructed based on the first key information to obtain the first time information; and Determining the second time information based on the second sequence may include the following:

inputting the second spatial information into a third preset model to obtain second key information; and inputting the second sequence into a fourth preset model constructed based on the second key information to obtain the second time information.

More specifically, performing information interaction based on the first spatial information, the second spatial information, the first time information and the second time information to obtain the interaction feature, where the interaction feature includes the time feature and/or the spatial feature may include the following:

taking the first spatial information and the second spatial information as the spatial feature, taking the first time information and the second time information as the time feature, and inputting the spatial feature and the time feature into a factorization machine model for a first-order interaction and a second-order interaction.

More specifically, travel prediction method may further include the following after performing information interaction based on the first spatial information, the second spatial information, the first time information and the second time information to obtain the interaction feature, wherein the interaction feature comprising the time feature and/or the spatial feature.

obtaining user-planned travel time period; and determining a location to which the user travels with the largest probability based on a comparison of the user-planned travel time period against the interaction feature, the user-planned travel time period matching the time feature.

In a second aspect, an embodiment of the present disclosure further provides a travel prediction apparatus, which includes a data acquisition module, a spatial information mining module, a time information mining module, an information interaction module, and a travel probability prediction module.

The data acquisition module is configured to obtain search data and travel path data of a user.

The spatial information mining module is configured to perform spatial information mining based on the search data to obtain first spatial information, and perform spatial information mining based on the travel path data to obtain second spatial information.

The time information mining module is configured to perform time information mining based on the first spatial information to obtain first time information, and perform time information mining based on the second spatial information to obtain second time information.

The information interaction module is configured to perform information interaction based on the first spatial information, the second spatial information, the first time information and the second time information to obtain an interaction feature, where the interaction feature includes a time feature and/or a spatial feature.

The travel probability prediction module is configured to predict a travel probability of the user going to a target location in a target time period based on the interaction feature, the target time period matching the time feature, and the target location matching the spatial feature.

In a third aspect, an embodiment of the present disclosure provides a travel prediction device, which includes a memory and a processor. The memory stores a computer program executable by the processor, and the computer program when executed by the processor causes the processor to perform the above-described travel prediction methods.

In a fourth aspect, an embodiment of the present disclosure provides a computer-readable storage medium storing a computer program, the computer program including program instructions, which when executed causes the above-described travel prediction methods to be performed.

According to the technical solution provided in the embodiments of the present disclosure, spatial information mining is performed on the search data to obtain the first spatial information, and is performed on the travel path data to obtain the second spatial information. Then time information mining is performed based on the first spatial information to obtain the first time information, and is performed based on the second spatial information to obtain the second time information. And then information interaction is performed based on the first spatial information, the second spatial information, the first time information, and the second time information to obtain the interaction feature. Finally, the user's travel probability is predicted by using the interaction feature. In this solution, the spatial information mining and time information mining are successively performed based on the search data and the travel path data, and then the obtained information is interacted to obtain the interaction feature. Therefore, the data mining is sufficiently deep, and time information and spatial information are fully considered in the travel prediction, thereby providing more accurate prediction results.

DETAILED DESCRIPTION

Figure 1:
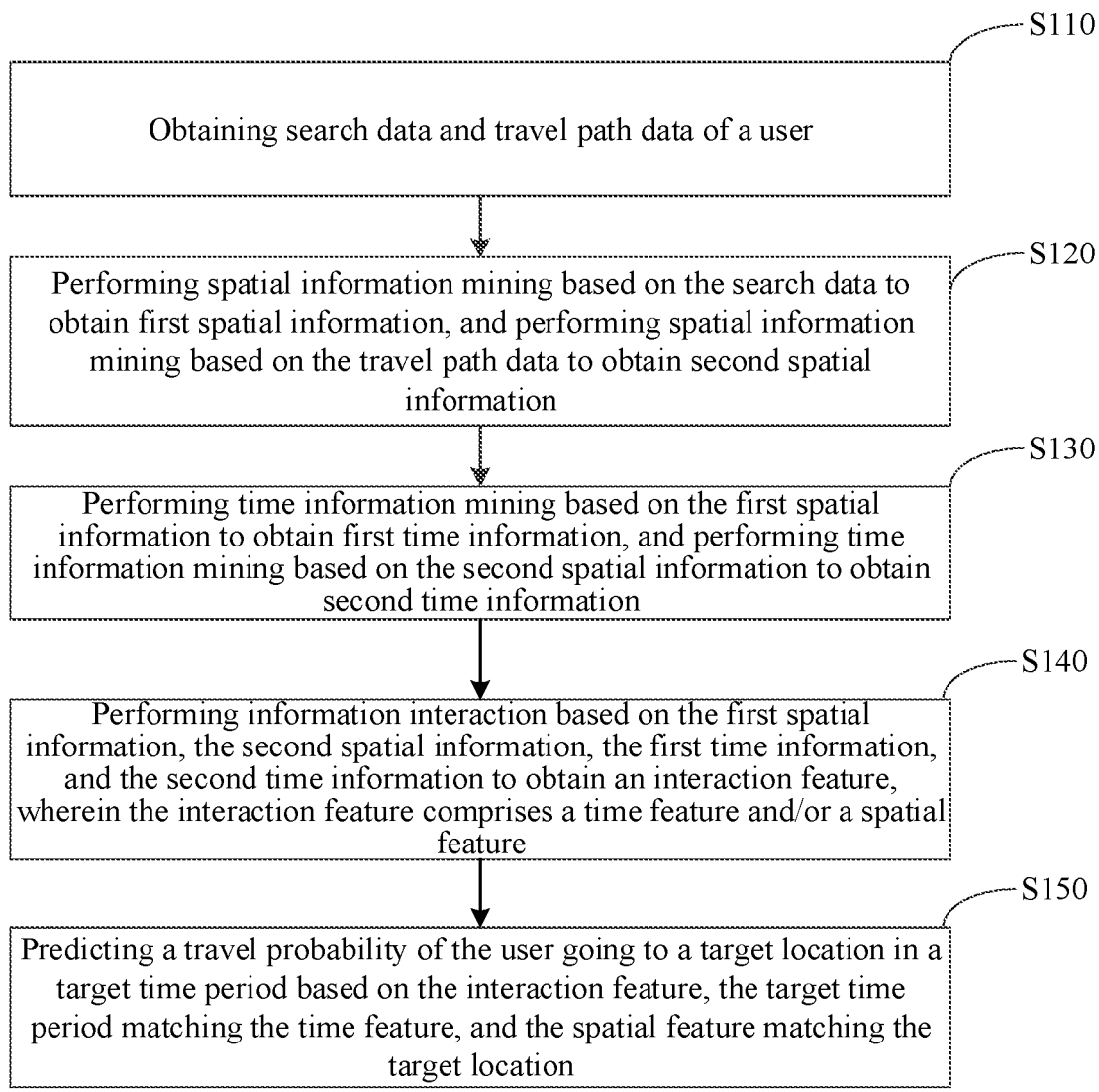
FIG. 1 is a flowchart of a travel prediction method according to an embodiment of the present disclosure.

Hereinafter the present disclosure will be further described in detail in connection with the drawings and embodiments. It is to be understood that the specific embodiments set forth below are intended to illustrate rather than limiting the present disclosure. Additionally, for ease of description, only part, rather than all, of the structures related to the present disclosure are illustrated in the drawings.

Unless otherwise defined, all technical and scientific terms used herein have the same meanings as the terms commonly understood by those skilled in the art. Terms used in the description of the present disclosure are merely used to describe specific embodiments and not intended to limit the present disclosure. The term "and/or" used herein includes any or all combinations of one or more listed associated items. As used herein, the term "plurality" is defined as at least two, e.g., two or three, unless otherwise specified and defined.

Furthermore, the terms "first", "second", and the like may be used herein to describe various directions, acts, steps, or elements, etc., but these directions, acts, steps, or elements are not limited by these terms. These terms are only used to distinguish one direction, action, step or element from another direction, action, step or element. For example, without departing from the scope of the disclosure, a first preset model may be referred to as a second preset model, and similarly, the second preset model may be referred to as the first preset model. The first preset model and the second preset model are both preset models, but are not a same preset model. Terms like "first", "second" and the like are not to be construed as indicating or implying relative importance or implicitly indicating the number of technical features as indicated. Thus, a feature defined as a "first" feature or a "second" feature may explicitly or implicitly include one or more of such a feature. As used herein, the term "plurality" is defined as at least two, e.g., two or three, unless otherwise specified and defined. It is to be noted that when a component is described as being "fixed to" another component, it may be directly on the particular component or intervening components may be on the particular component. When a component is described as being "connected to" another component, it may be directly connected to the particular component or intervening components may be connected to the particular component. The terms "vertical", "horizontal", "left", "right" and the like, as used herein, are only used for an illustrative purpose and are not the only embodiment.

Before exemplary embodiments are discussed in more detail, it should be noted that part of the exemplary embodiments are described as processes or methods depicted in flowcharts. Although the flowcharts describe the steps as sequentially processed, many of the steps may be implemented concurrently, coincidently or simultaneously. Additionally, the sequence of the steps may be rearranged. Each of the processes may be terminated when the operations are completed, but may further have additional steps not included in the drawings. Each of the processes may correspond to one of a method, a function, a procedure, a subroutine, a subprogram, etc.

FIG. 1 is a flowchart of a travel prediction method according to an embodiment of the present disclosure, and the travel prediction method can be performed by any terminal/server capable of making travel prediction. The travel prediction method may include the following operations.

In step S110, search data and travel path data of the user are obtained.

The search data is data collected when the user searches locations and may reflect user's travel intention, and the search data includes one or more of data such as search time, the name of the user-searched location, the longitude and latitude of the user-searched location, the number of searches, etc. The travel path data is actual travel data of the user collected by positioning the user's location, and the travel path data correspondingly includes one or more of data such as passing time, the name of user-passed location, the longitude and latitude of user-passed location, etc.

Exemplarily, the search data may be collected by the terminal when the user uses a mapping software, and it may also be collected by the terminal when the user uses a travel ticket purchasing software. The travel path data may be obtained in real time using GPS positioning based on the terminal carried by the user, and the travel path data may be collected according to a consumption record of the user. The manner of obtaining the search data and travel path data will not be limited herein, and the above is merely an example.

In step S120, spatial information mining is performed based on the search data to obtain first spatial information, and is performed based on the travel path data to obtain second spatial information.

The first spatial information is obtained by spatial information mining based on the search data, and the spatial information mining refers to mapping longitude and latitude to a high-dimensional space through embedding learning based on two-dimensional longitude and latitude to obtain spatial information that can describe the location more richly. The second spatial information is in a similar way. For purposes of distinction, the spatial information obtained by spatial information mining based on the search data is referred to as the first spatial information, and the spatial information obtained by spatial information mining based on the travel path data is referred to as the second spatial information.

Performing the spatial information mining based on the search data to obtain the first spatial information includes steps described below (not shown in figure).

In step S1211, longitude and latitude information of a user-searched location is determined based on the search data.

In step 1212, the longitude and latitude information of the user-searched location is mapped to a high-dimensional space to obtain the first spatial information.

Performing the spatial information mining based on the travel path data to obtain the second spatial information includes steps described below (not shown in figure).

In step S1221, longitude and latitude information of a user-passed location is determined based on the travel path data.

In step S1222, the longitude and latitude information of the user-passed location is mapped to the high-dimensional space to obtain the second spatial information.

Exemplarily, the determination of the first spatial information and the second spatial information may be performed only when the travel prediction is required. If the terminal judges that the user needs a corresponding travel recommendation, the spatial information mining will be perform on the search data and the travel path data, and the search data and the travel path data collected within a certain period time may only be mined according to different actual requirements, so as to avoid excessive data and slow speed processing which may otherwise affect user experience.

In step S130, time information mining is performed based on the first spatial information to obtain first time information, and is performed based on the second spatial information to obtain second time information.

The first time information can be understood as hidden time information obtained by further time information mining after performing spatial information mining based on the search data. The first spatial information plays an important role in the determination of the first time information, which can be understood as further dividing and describing the time information in the search data based on the first spatial information to obtain the first time information with more real meaning, and the second time information is in a similar way. For purposes of distinction, the hidden time information obtained by time information mining based on the first spatial information is referred to as the first time information, and the hidden time information obtained by time information mining based on the second spatial information is referred to as the second time information.

The determination of the first time information and the second time information may also be performed when the travel prediction is required. The process of time information mining is after the process of spatial information mining, however, the determining of the first time information is not necessarily after the determining of the second spatial information. After the first spatial information is mined by the terminal, the terminal may directly mine the corresponding first time information, and then mine the second spatial information and the second time information; and the terminal may also directly mine the second spatial information, and then mine the first time information and the second time information.

In step S140, information interaction is performed based on the first spatial information, the second spatial information, the first time information, and the second time information to obtain an interaction feature, where the interaction feature includes a time feature and/or a spatial feature.

The information interaction refers to cross-combination of different information to obtain new information. Since the new information will be used as the basis for predicting users' travel, it is referred to the interaction feature here. The idea of factorization machine (FM) is used for reference here, and the factorization machine mainly solves the problem of feature combination under sparse data. Prediction based on the factorization machine has good universality for continuous and discrete features. An ordinary linear model considers each feature independently and does not consider the relationship between features, but actually, the features may have a certain correlation. The decomposer solves the sparsity problem of feature interaction, model parameters can be learned by a gradient descent method, and the features can be better utilized based on the factorization machine.

More specifically, the factorization machine may perform a first-order, a second-order, and a multi-order interaction. In some embodiments, the information interaction performed in S140 is the first-order and the second-order interactions based on the factorization machine model, that is, the step S140 specifically includes a step described below. The first spatial information and the second spatial information are taken as the spatial feature, the first time information and the second time information are taken as the time feature, and the spatial feature and the time feature are inputted into a factorization machine model for the first-order interaction and the second-order interaction. In the factorization machine model, the interaction is based on features. The embodiment aggregates the spatial information as a class of features, the time information is served as another class of features to interact, where the first-order interaction is not to interact with other information, and the second-order interaction refers to the interaction between the time information and the spatial information. The final interaction feature may be a time feature or a spatial feature or a time feature added a spatial feature.

In step S150, a travel probability of the user going to a target location in a target time period is predicted based on the interaction feature.

The target time period refers to a time period from the current time of the user (which can be based on the latest travel path data and search data collected) to a certain time later. The target location refers to the location with analysis requirements (if a place is a tourist spot, future reception volume is required to analyze). The travel probability of the user refers to the probability that the user travels to a designated location in a designated time period. After the interaction feature is obtained based on the idea of factorization machine, sigmoid function is used to further predict the travel probability of the user in the embodiment. The sigmoid function is a common function in machine learning. An advantage of the sigmoid function is that an output range of the sigmoid function is limited, so it is not easy to diverge in the process of data transmission, and the output range is (0, 1), therefore, the output can be used to express probability. In the embodiment, the interaction feature is taken as an input, and each interaction feature is input into the sigmoid function to obtain an output in the (0, 1) interval, the output is a probability used to describe the corresponding interaction feature (if the interaction feature only includes the time feature, it represents the probability of time travel corresponding to the time feature, if the interaction feature only includes the spatial feature, it represents the probability of travelling to the location corresponding to the spatial feature, and if the interaction feature includes the time feature and the spatial feature, it represents the probability of appearing on the location corresponding to the spatial feature at the time corresponding to the time feature). However, in the case the actual travel situation of the user is predicted, only the target time period of the user and/or the target location of the user need to be known, where the target time period and the time feature are matched, and the target location and the spatial feature are matched, and after the matching is completed, the travel probability of the user to the target location in the target time period can be determined.

In a technical solution provided in the embodiment, the spatial information mining is performed on the search data to obtain the first spatial information, the spatial information mining is performed on the travel path data to obtain the second spatial information, the time information mining is performed based on the first spatial information to obtain the first time information, the time information mining is performed based on the second spatial information to obtain the second time information, and then the information interaction is performed based on the first spatial information, the second spatial information, the first time information and the second time information to obtain the interaction feature, finally, the travel probability of the user is predicted by using the interaction feature. In the solution, the spatial information mining and the time information mining are successively performed based on the search data and the travel path data, and then the obtained information is interacted to obtain the interaction feature. Therefore, the data mining is sufficiently deep, and time information and spatial information are fully considered in travel prediction, thereby providing more accurate prediction result.

Another embodiment of the present disclosure provides a travel prediction method. In the present embodiment, some contents on the basis of the previous embodiment are further subdivided and explained below.

The previous embodiment has explained that both the first spatial information and the second spatial information are obtained based on the longitude and latitude information, and mapping the longitude and latitude information of the user-searched location to the high-dimensional space to obtain the first spatial information specifically includes steps described below.

In step S12121, behavior information corresponding to the user-searched location is mined based on the longitude and latitude information of the user-searched location.

In step S12122, the first spatial information is determined according to the behavior information corresponding to the user-searched location.

Mapping the longitude and latitude information of the user-passed location to the high-dimensional space to obtain the second spatial information includes steps described below.

In step S12221, behavior information corresponding to the user-passed location is mined based on the longitude and latitude information of the user-passed location.

In step S12222, the second spatial information is determined based on the behavior information corresponding to the user-passed location.

The behavior information is to analyze real activities of the user in the location according to a location, which can be understood as life patterns mined according to a large amount of data, and corresponding spatial information is semantic information added to the real activities or life patterns. Such as travel path data, the user commutes between home and company on weekdays according to the travel path data. According to the longitude and latitude information corresponding to the home and the company, actual buildings in the area are determined, and it is determined that the residential area and the office building correspond to each other respectively. The behavior information of the user in the two places is determined to be office and life by analysis, semantic description is added to the corresponding longitude and latitude information: office area or living area, and the second spatial information can be obtained according to the added semantic description. The first spatial information is in a similar way. Of course, an example is shown herein, and the actual added semantic description can be more complex content.

Figure 2:
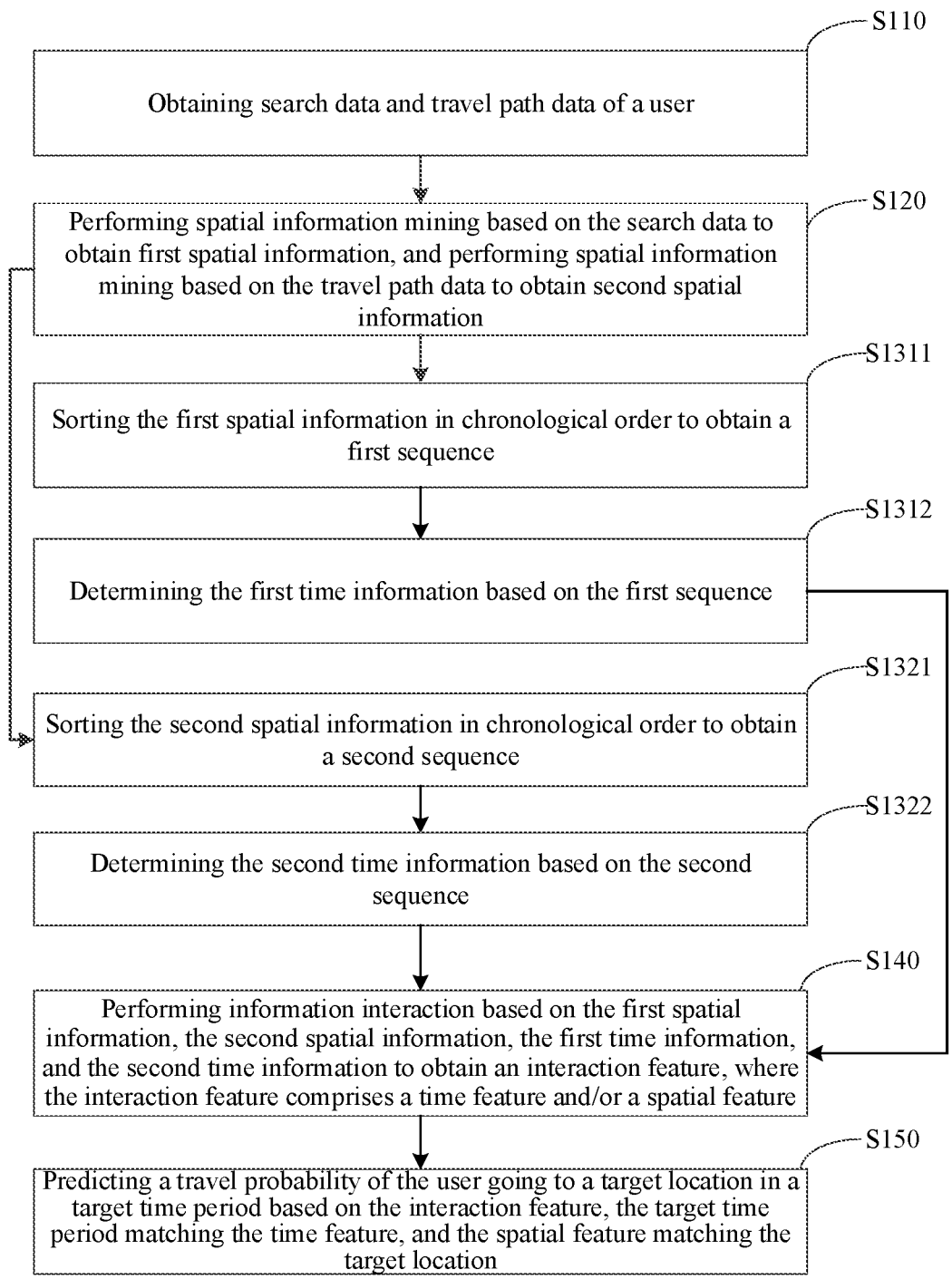
FIG. 2 is a flowchart of a travel prediction method according to another embodiment of the present disclosure.

More specifically, in some embodiments, as shown in FIG. 2, performing the time information mining based on the first spatial information to obtain the first time information includes steps described below.

In step S1311, the first spatial information is sorted in chronological order to obtain a first sequence.

According to the step S12122, it can be seen that the first spatial information actually corresponds to the behavior information of the user, and the user's behavior is related in chronological order. Based on this, the present embodiment further mines the time information, and the first spatial information is sequentially sorted in chronological order to obtain the first sequence, which is convenient for subsequent time information mining.

In step S1312, the first time information is determined according to the first sequence.

In the embodiment, in order to mine the time information in the first sequence, an attention mechanism and a long short-term memory (LSTM) are combined to mine the hidden time information. Specifically, the step S1312 includes steps described below (not shown).

In step S13121, the first spatial information is inputted into a first preset model to obtain first key information.

The first preset model is an attention model (AM), the first key information is an important event (corresponding to the behavior information of the user) determined by the attention model according to the first spatial information, and the important event plays a role in the subsequent long short-term memory.

In step S13122, the first sequence is inputted into a second preset model constructed according to the first key information to obtain the first time information.

The second preset model is an LSTM model, where the LSTM model is a special recurrent neural network (RNN) model, and the RNN model is suitable for processing and predicting the important event with very long intervals and delays in a chronological order (the first sequence), where the first key information is an important event.

Performing the time information mining based on the second spatial information to obtain the second time information includes steps described below.

In step S1321, the second spatial information is sorted in chronological order to obtain a second sequence.

In step S1322, the second time information is determined based on the second sequence.

Specifically, the step S1322 includes steps described below (not shown).

In step S13221, the second spatial information is inputted into a third preset model to obtain second key information.

In step S13222, the second sequence is inputted into a fourth preset model constructed based on the second key information to obtain the second time information.

Similar to steps S13211 to S13212, the third preset model is the attention model, and the fourth preset model is the LSTM model. The third preset model and the fourth preset module may have certain differences in specific structures based on different processed data (one is search data and the other is travel path data), but the actual function is the same.

Figure 3:
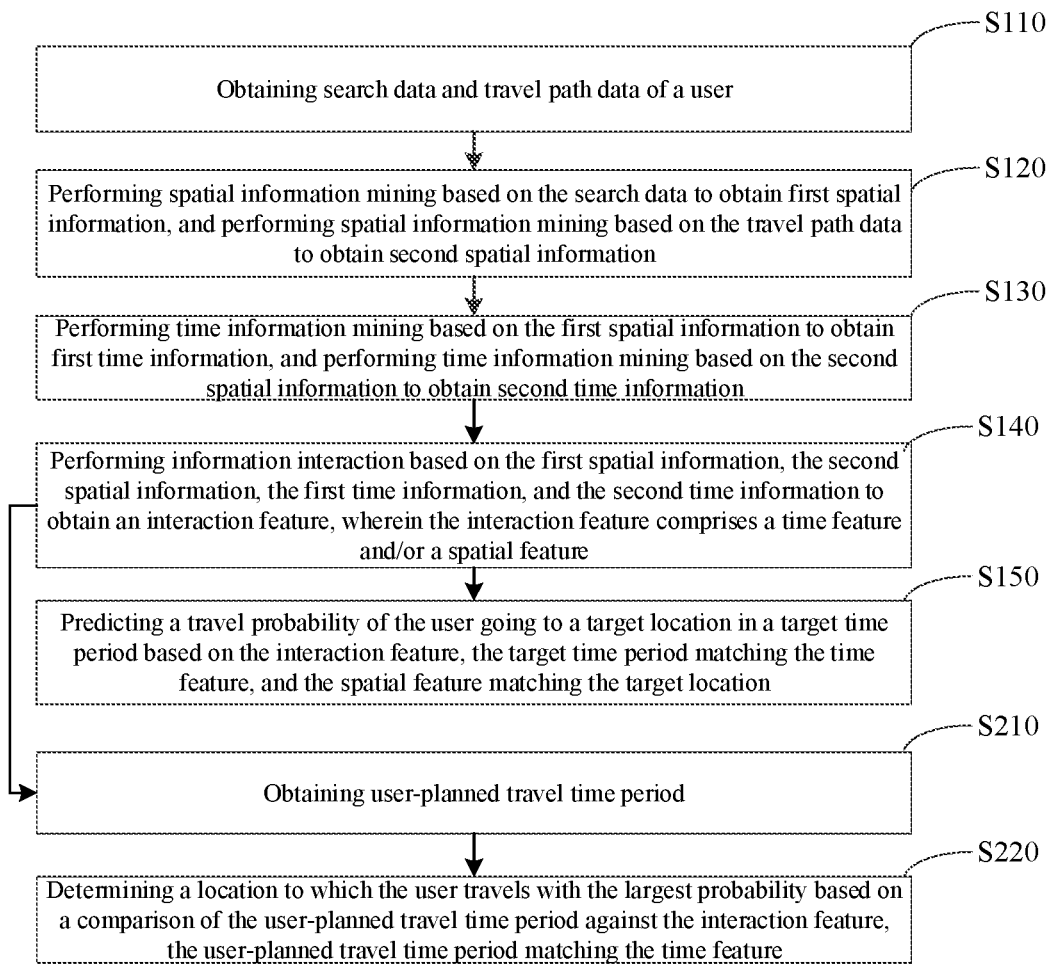
FIG. 3 is a flowchart of a travel prediction method according to yet another embodiment of the present disclosure.

More specifically, as shown in FIG. 3, after the step 150, the travel prediction method provided in yet another embodiment further includes steps described below.

In step S210, user-planned travel time period is acquired.

In step S220, a location to which the user travels with the largest probability is determined based on a comparison of the planned travel time period against the interaction feature, and the planned travel time period and the time feature are matched.

The embodiment is directed to a situation where the travel location of the user needs to be predicted, and the above-mentioned embodiments have predicted the travel probability of the user in the target time period and/or the target location. In a case where it is necessary to predict the travel location of the user (it is necessary to recommend the travel location of the user, such as travel advertisement), and the travel probability corresponding to the interaction feature has been determined, the travel location where the user has the greatest travel probability in the user-planned travel time period, that is, the location where the user has the greatest travel probability, can be directly determined according to the user-planned travel time period.

In the travel prediction method provided in the embodiment, the specific process of performing spatial information mining and the specific process of performing time information mining are further provided. The method realized sufficiently deep data mining, the time information and the spatial information are fully considered in the travel prediction, and the prediction results are more accurate.

Figure 4:
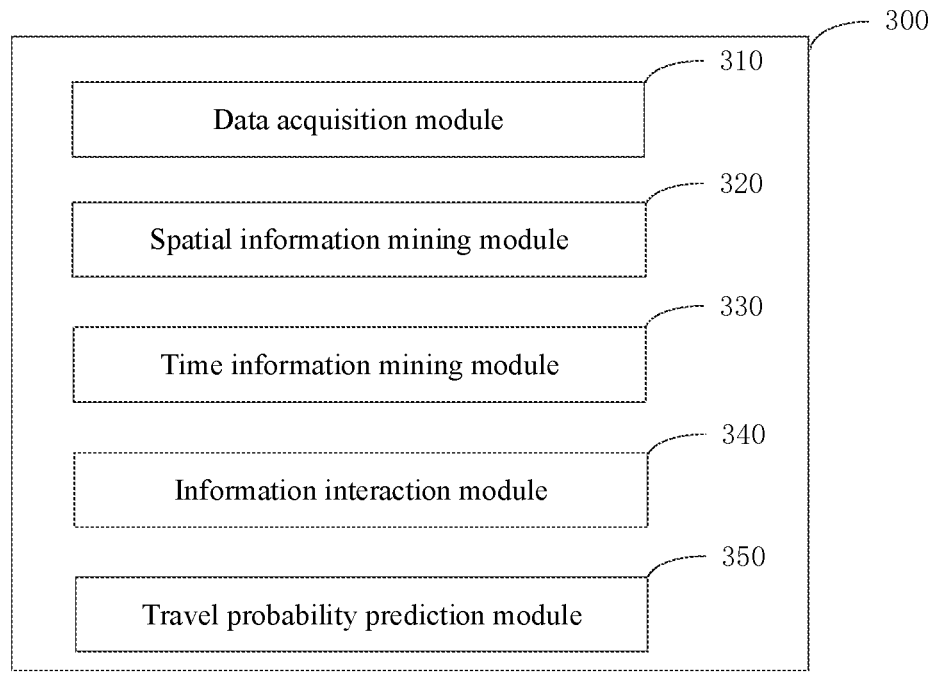
FIG. 4 is a block diagram of a travel prediction apparatus according to an embodiment of the present disclosure.

FIG. 4 is a block diagram of a travel prediction apparatus according to an embodiment of the present disclosure. The specific structures of the travel prediction apparatus is as follows.

A data acquisition module 310, which is configured to obtain search data of a user and travel path data of the user.

A spatial information mining module 320, which is configured to perform spatial information mining based on the search data to obtain first spatial information, and perform spatial information mining based on the travel path data to obtain second spatial information.

A time information mining module 330, which is configured to perform time information mining based on the first spatial information to obtain first time information, and perform time information mining based on the second spatial information to obtain second time information.

An information interaction module 340, which is configured to perform information interaction based on the first spatial information, the second spatial information, the first time information and the second time information to obtain an interaction feature, where the interaction feature includes a time feature and/or a spatial feature.

A travel probability prediction module 350, which is configured to predict a travel probability of the user going to a target location in a target time period based on the interaction feature, the target time period matching the time feature, and the target location matching the spatial feature.

More specifically, in some embodiments, the spatial information mining module 320 includes a longitude and latitude determining unit and a spatial information determining unit.

The longitude and latitude determining unit is configured to determine longitude and latitude information of a user-searched location based on the search data.

The spatial information determining unit is configured to map the longitude and latitude information of the user-searched location to a high-dimensional space to obtain the first spatial information.

The longitude and latitude determining unit is further configured to determine longitude and latitude information of a user-passed location according to the travel path data. The spatial information determining unit is further configured to map the longitude and latitude information of the user-passed location to the high-dimensional space to obtain the second spatial information.

More specifically, the spatial information determining unit includes a behavior information determining sub-unit and a spatial information determining sub-unit.

The behavior information determining sub-unit is configured to mine behavior information corresponding to the user-searched location according to the longitude and latitude information of the user-searched location, and mine behavior information corresponding to the user-passed location based on the longitude and latitude information of the user-passed location.

The spatial information determining sub-unit is configured to determine the first spatial information based on the behavior information corresponding to the user-searched location, and determine the second spatial information based on the behavior information corresponding to the user-passed location.

More specifically, the time information mining module 330 includes a sorting unit and a time information determining unit.

The sorting unit is configured to sort the first spatial information in chronological order to obtain a first sequence, and sort the second spatial information in chronological order to obtain a second sequence.

The time information determining unit is configured to determine the first time information based on the first sequence, and determine the second time information based on the second sequence.

More specifically, the time information determining unit includes a key information determining sub-unit and a time information determining sub-unit.

The key information determining sub-unit is configured to input the first spatial information into a first preset model to obtain first key information, and input the second spatial information into a third preset model to obtain second key information.

The time information determining sub-unit is configured to input the first sequence into a second preset model constructed according to the first key information to obtain the first time information, and input the second sequence into a fourth preset model constructed according to the second key information to obtain the second time information.

More specifically, the information interaction module 340 is configured to take the first spatial information and the second spatial information as the spatial feature, take the first time information and the second time information as the time feature, and input the spatial feature and the time feature into a factorization machine model for a first-order interaction and a second-order interaction.

More specifically, in some embodiments, the travel prediction apparatus further includes a time determining module and a travel location determining module.

The time determining module is configured to obtain user-planned travel time period.

The travel location determining module is configured to determine a location to which the user travels with the largest probability based on a comparison of the planned travel time period against the interaction feature, and match the user-planned travel time period and the time feature.

The embodiment further provides a travel prediction apparatus. The spatial information mining is performed on the search data to obtain the first spatial information, the spatial information mining is performed on the travel path data to obtain the second spatial information, the time information mining is performed based on the first spatial information to obtain the first time information, the time information mining is performed based on the second spatial information to obtain the second time information, and then the information interaction is performed based on the first spatial information, the second spatial information, the first time information and the second time information to obtain the interaction feature, finally, the travel probability of the user is predicted by using the interaction feature. In the solution, the spatial information mining and the time information mining are successively performed based on the search data and the travel path data, and then the obtained information is interacted to obtain the interaction feature. Therefore, the data mining is sufficiently deep, and time information and spatial information are fully considered in travel prediction, thereby providing more accurate prediction result.

The travel prediction apparatus provided in the embodiment of the present disclosure can execute any one of the travel prediction method according to the above-mentioned embodiments of the present disclosure, and has functional modules and beneficial effects corresponding to the execution methods.

Figure 5:
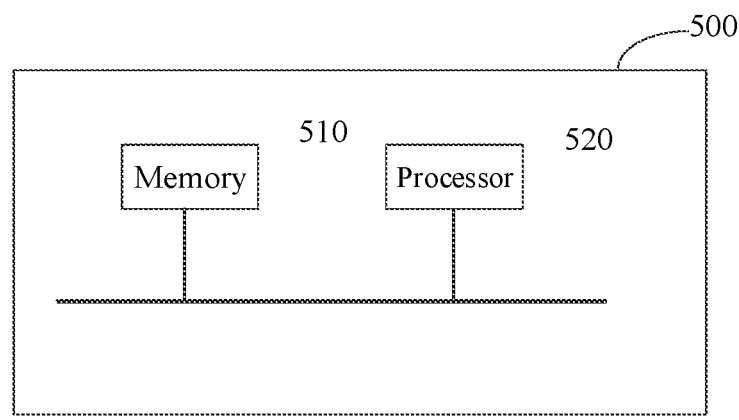
FIG. 5 is a block diagram of a travel prediction device according to an embodiment of the present disclosure.

FIG. 5 is a block diagram of a travel prediction device 500 according to an embodiment of the present disclosure. As illustrated in FIG. 5, the travel prediction device includes a memory 510 and a processor 520. The number of processors 520 in the travel prediction device may be one or more, and one processor 520 is used as an example in FIG. 5. The memory 510 and the processor 520 in the travel prediction device may be connected through a bus or in other ways. In FIG. 5, the connection through the bus is used as an example.

The memory 510 as a computer-readable storage medium can be used for storing software programs, computer executable programs and modules, for example, program instructions/modules corresponding to the travel prediction method in the embodiments of the present disclosure (for example, the data acquisition module 310, the spatial information mining module 320, the time information mining module 330, the information interaction module 340 and the travel probability prediction module 350 in the travel prediction apparatus). The processor 520 executes various function applications and data processing of the travel prediction device, that is, implements the above-mentioned travel prediction method, by executing software programs, instructions and modules stored in the memory 510.

The processor 520 is configured to execute computer executable programs stored in the memory 510 to implement steps described below.

Search data and travel path data of the user are obtained.

Spatial information mining is performed based on the search data to obtain first spatial information, and is performed based on the travel path data to obtain second spatial information.

Time information mining is performed based on the first spatial information to obtain first time information, and is performed based on the second spatial information to obtain second time information.

Information interaction is performed based on the first spatial information, the second spatial information, the first time information, and the second time information to obtain an interaction feature.

A travel probability of the user going to a target location in a target time period is predicted based on the interaction feature, where the target time period matches the time feature, and the target location matches the spatial feature.

In the travel prediction device provided in the embodiments of the present disclosure, the travel prediction device performs not only the above-mentioned method operations but also related operations in the travel prediction method provided in any embodiment of the present disclosure.

The memory 510 may mainly include a program storage area and a data storage area. The program storage area may store an operating system and an application program required for implementing at least one function while the data storage area may store data created depending on use of terminals. In addition, the memory 510 may include a high-speed random access memory, and may also include a nonvolatile memory, such as at least one click memory, flash memory or another nonvolatile solid-state memory. In some examples, the memory 510 may further include memories located remotely relative to the processor 520 and these remote memories may be connected to the travel prediction device via networks. Examples of the above network include, but are not limited to, the Internet, an intranet, a local area network, a mobile communication network and a combination thereof.

The above-mentioned device can execute the travel prediction method provided in any embodiment of the present disclosure, and has functional modules and beneficial effects corresponding to the execution method.

An embodiment of the present disclosure further provides a storage medium containing computer-executable instructions that, when executed by a computer processor, implement a travel prediction method. The method includes steps described below.

Search data of a user and travel path data of the user are obtained.

Spatial information mining is performed based on the search data to obtain first spatial information, and is performed based on the travel path data to obtain second spatial information.

Time information mining is performed based on the first spatial information to obtain first time information, and is performed based on the second spatial information to obtain second time information.

Information interaction is performed based on the first spatial information, the second spatial information, the first time information, and the second time information to obtain an interaction feature, where the interaction feature includes a time feature and/or a spatial feature.

A travel probability of the user going to a target location in a target time period is predicted based on the interaction feature, where the target time period matches the time feature, and the target location matches the spatial feature.

In the storage medium containing computer-executable instructions provided in embodiments of the present disclosure, the computer-executable instructions implement not only the above-mentioned method operations but also related operations in the travel prediction method provided in any embodiment of the present disclosure.

From the above description of embodiments, it will be apparent to those skilled in the art that the present disclosure may be implemented by means of software in combination with necessary general-purpose hardware, or may also be implemented by hardware, but in many cases the former is a preferred implementation. Based on this understanding, the substantial technical solutions provided in the present disclosure, or the part contributing to the related art, may be embodied in the form of a software product. Software products may be stored in a computer readable storage medium, such as a computer floppy disk, a read-only memory (ROM), a random access memory (RAM), a flash, a hard disk or an optical disk, and which may include multiple instructions for enabling a computer device (which may be a personal computer, a travel prediction device or a network device) to execute the method according to each embodiment of the present disclosure.

It is to be noted that units and modules included in the embodiment of the above-mentioned travel prediction apparatus are just divided depending on their functional logic, and the division will not be limited to this, as long as the corresponding functions can be achieved. In addition, the specific names of the each functional unit are intended merely for distinguishing, rather than limiting the scope of protection of the present disclosure.

The foregoing merely depicts some illustrative embodiments according to the present disclosure and the technical principles used herein. Those skilled in the art will appreciate that the present disclosure will not be limited to the specific embodiments described herein. Those skilled in the art would be able to make various apparent modifications, adaptations and substitutions without departing from the scope of the present disclosure. Therefore, while the present disclosure has been described in detail in connection with the preceding embodiments, the present disclosure will not be limited to the preceding embodiments and may include many other equivalent embodiments without departing from the concept of the present disclosure. The scope of the present disclosure is thus only determined in and by the appended claims.

The invention claimed is:

1. A travel prediction method, comprising:
   obtaining search data and travel path data of a user;
   performing spatial information mining based on the search data to obtain first spatial information by:
      determining longitude and latitude information of a user-searched location according to the search data; and
      mapping the longitude and latitude information of the user-searched location to a high-dimensional space to obtain the first spatial information;
   performing spatial information mining based on the travel path data to obtain second spatial information by:
      determining longitude and latitude information of a user-passed location according to the travel path data; and
      mapping the longitude and latitude information of the user-passed location to a high-dimensional space to obtain the second spatial information;
   performing time information mining based on the first spatial information to obtain first time information by:
      sorting the first spatial information in chronological order to obtain a first sequence; and
      determining the first time information based on the first sequence;
      wherein mining the first time information comprises using an attention mechanism and a long short-term memory (LSTM);
   performing time information mining based on the second spatial information to obtain second time information by:
      sorting the second spatial information in chronological order to obtain a second sequence; and
      determining the second time information based on the second sequence;
   performing information interaction based on the first spatial information, the second spatial information, the first time information, and the second time information to obtain an interaction feature, wherein the interaction feature comprises a time feature and a spatial feature, the performing information interaction step comprising:
      taking the first spatial information and the second spatial information as the spatial feature;
      taking the first time information and the second time information as the time feature; and
      inputting the spatial feature and the time feature into a factorization machine model for a first-order interaction and a second-order interaction; and predicting a travel probability of the user going to a target location in a target time period based on the interaction feature, the target time period matching the time feature, and the spatial feature matching the target location.

2. The travel prediction method of claim 1, wherein:
mapping the longitude and latitude information of the user-searched location to the high-dimensional space to obtain the first spatial information comprises:
mining behavior information corresponding to the user-searched location based on the longitude and latitude information of the user-searched location; and
determining the first spatial information based on the behavior information corresponding to the user-searched location; and
mapping the longitude and latitude information of the user-passed location to the high-dimensional space to obtain the second spatial information comprises:
mining behavior information corresponding to the user-passed location based on the longitude and latitude information of the user-passed location; and
determining the second spatial information based on the behavior information corresponding to the user-passed location.

3. The travel prediction method of claim 1, wherein:
determining the first time information based on the first sequence comprises:
inputting the first spatial information into a first preset model to obtain first key information; and
inputting the first sequence into a second preset model constructed based on the first key information to obtain the first time information; and
determining the second time information based on the second sequence comprises:
inputting the second spatial information into a third preset model to obtain second key information; and
inputting the second sequence into a fourth preset model constructed based on the second key information to obtain the second time information.

4. The travel prediction method of claim 1, further comprising performing, after performance of the performing information interaction step:
obtaining user-planned travel time period; and
determining a location to which the user travels with the largest probability based on a comparison of the user-planned travel time period against the interaction feature, the user-planned travel time period matching the time feature.

5. A travel prediction apparatus comprising a processor and a memory storing a computer program that is executable by the processor, the computer program comprising:
a data acquisition module configured to obtain search data of and travel path data of a user; and
a spatial information mining module configured to perform spatial information mining based on the search data to obtain first spatial information, and perform spatial information mining based on the travel path data to obtain second spatial information, wherein the spatial information mining module comprises:
a longitude and latitude determining unit configured to:
determine longitude and latitude information of a user-searched location according to the search data; and
determine longitude and latitude information of a user-passed location according to the travel path data; and a spatial information determining unit configured to:
map the longitude and latitude information of the user-searched location to a high-dimensional space to obtain the first spatial information; and
map the longitude and latitude information of the user-passed location to a high-dimensional space to obtain the second spatial information;
a time information mining module configured to perform time information mining based on the first spatial information to obtain first time information, and perform time information mining based on the second spatial information to obtain second time information, wherein the time information module comprises:
a sorting unit configured to:
sort the first spatial information in chronological order to obtain a first sequence; and
sort the second spatial information in chronological order to obtain a second sequence; and
a time information determining unit configured to:
determine the first time information based on the first sequence; and
determine the second time information based on the second sequence;
wherein mining the first time information comprises using an attention mechanism and a long short-term memory (LSTM);
an information interaction module configured to perform information interaction based on the first spatial information, the second spatial information, the first time information, and the second time information to obtain an interaction feature, wherein the interaction feature comprises a time feature and a spatial feature, wherein the information interaction module is configured for:
taking the first spatial information and the second spatial information as the spatial feature;
taking the first time information and the second time information as the time feature; and
inputting the spatial feature and the time feature into a factorization machine model for a first-order interaction and a second-order interaction; and
a travel probability prediction module configured to predict a travel probability of the user going to a target location in a target time period based on the interaction feature, the target time period matching the time feature, and the target location matching the spatial feature.

6. The travel prediction apparatus of claim 5, wherein the spatial information determining unit comprises:
a behavior information determining sub-unit, configured to mine behavior information corresponding to the user-searched location based on the longitude and latitude information of the user-searched location, and mine behavior information corresponding to the user-passed location based on the longitude and latitude information of the user-passed location; and
a spatial information determining sub-unit, configured to determine the first spatial information based on the behavior information corresponding to the user-searched location, and determine the second spatial information based on the behavior information corresponding to the user-passed location.

7. The travel prediction apparatus of claim 5, wherein the time information determining unit comprises:
a key information determining sub-unit, configured to input the first spatial information into a first preset model to obtain first key information, and input the second spatial information into a third preset model to obtain second key information; and a time information determining sub-unit, configured to input the first sequence into a second preset model constructed based on the first key information to obtain the first time information, and input the second sequence into a fourth preset model constructed based on the second key information to obtain the second time information.

8. The travel prediction apparatus of claim 5, further comprising:

a time determining module configured to obtain user-planned travel time period; and a travel location determining module configured for determining a location to which the user travels with the largest probability based on a comparison of the user-planned travel time period against the interaction feature, the user-planned travel time period matching the time feature.

9. A non-transitory computer-readable storage medium storing instructions, which, when executed by a processor, causes performance of steps comprising:

obtaining search data and travel path data of a user;

performing spatial information mining based on the search data to obtain first spatial information by:

determining longitude and latitude information of a user-searched location according to the search data; and mapping the longitude and latitude information of the user-searched location to a high-dimensional space to obtain the first spatial information;

performing spatial information mining based on the travel path data to obtain second spatial information by:

determining longitude and latitude information of a user-passed location according to the travel path data; and mapping the longitude and latitude information of the user-passed location to a high-dimensional space to obtain the second spatial information;

performing time information mining based on the first spatial information to obtain first time information by:

sorting the first spatial information in chronological order to obtain a first sequence; and determining the first time information based on the first sequence;

wherein mining the first time information comprises using an attention mechanism and a long short-term memory (LSTM);

performing time information mining based on the second spatial information to obtain second time information by:

sorting the second spatial information in chronological order to obtain a second sequence; and determining the second time information based on the second sequence;

performing information interaction based on the first spatial information, the second spatial information, the first time information, and the second time information to obtain an interaction feature, wherein the interaction feature comprises a time feature and a spatial feature, the performing information interaction step comprising:

taking the first spatial information and the second spatial information as the spatial feature;

taking the first time information and the second time information as the time feature; and inputting the spatial feature and the time feature into a factorization machine model for a first-order interaction and a second-order interaction; and predicting a travel probability of the user going to a target location in a target time period based on the interaction feature, the target time period matching the time feature, and the spatial feature matching the target location.

10. The computer-readable storage medium of claim 9, wherein:

mapping the longitude and latitude information of the user-searched location to the high-dimensional space to obtain the first spatial information comprises:

mining behavior information corresponding to the user-searched location based on the longitude and latitude information of the user-searched location; and determining the first spatial information based on the behavior information corresponding to the user-searched location; and mapping the longitude and latitude information of the user-passed location to the high-dimensional space to obtain the second spatial information comprises:

mining behavior information corresponding to the user-passed location based on the longitude and latitude information of the user-passed location; and determining the second spatial information based on the behavior information corresponding to the user-passed location.

* * * * *